United States Patent Office 3,546,533
Patented Dec. 8, 1970

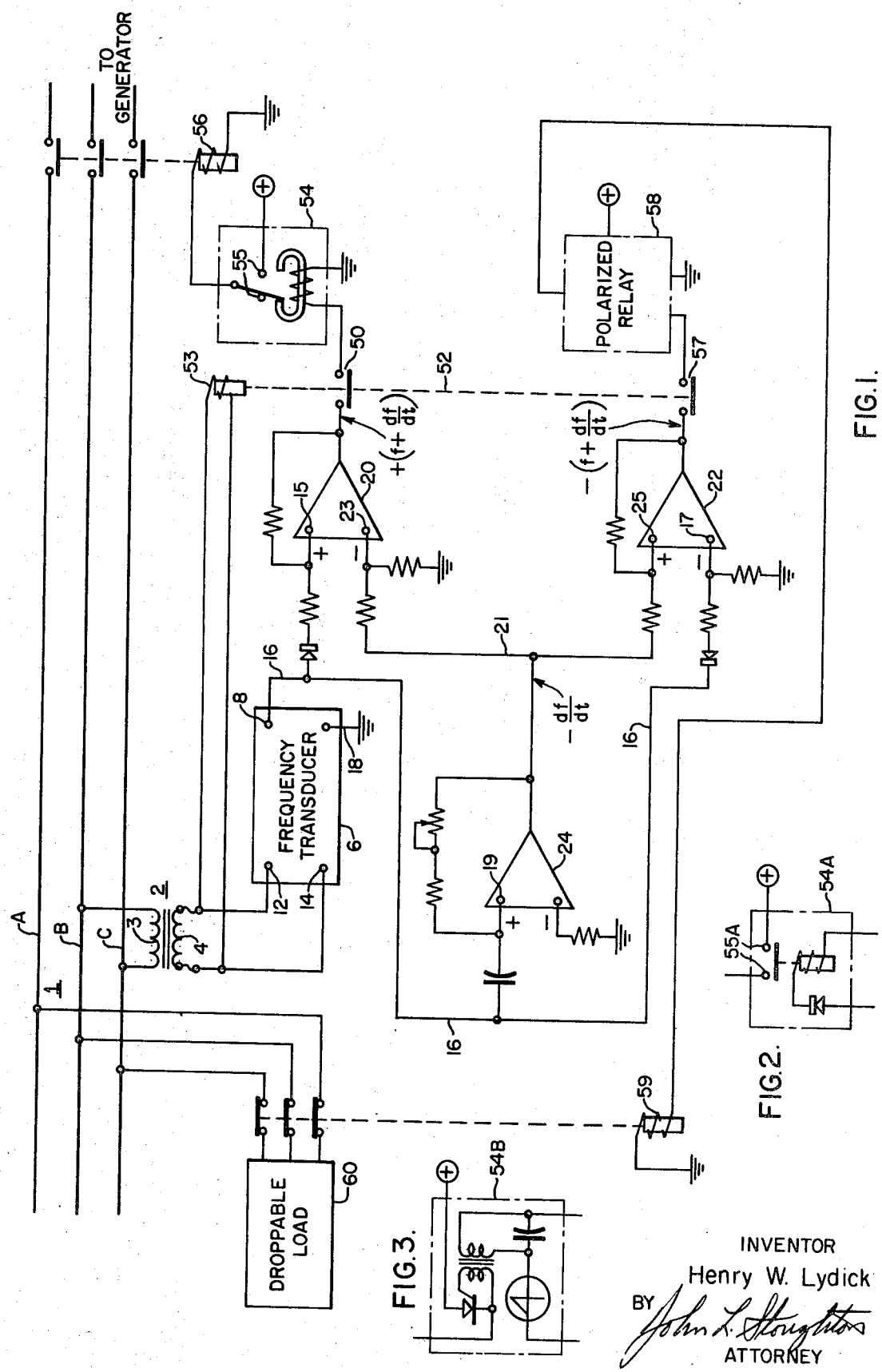

3,546,533
FREQUENCY RELAY WITH RATE-OF-CHANGE OF FREQUENCY COMPENSATION
Henry W. Lydick, Tucson, Ariz., assignor to Westinghouse Electric Corporation, Pittsburgh, Pa., a corporation of Pennsylvania
Filed Nov. 20, 1968, Ser. No. 777,257
Int. Cl. H02h 7/06
U.S. Cl. 317—13    14 Claims

ABSTRACT OF THE DISCLOSURE

A protecting relay for an alternating potential power system wherein there is provided means to disconnect at least a portion of the load connected to the system when a frequency signal or the sum of the frequency signal and a rate-of-change of frequency signal reaches a first critical magnitude representative of an undesired low system frequency and means to disconnect at least a portion of the source of energy from such system when the frequency signal or the sum of the frequency signal and a rate of change of frequency signal reaches a second critical magnitude representative of an undesired high system frequency.

BACKGROUND OF THE INVENTION

Large power systems pooling connections now being made link together large blocks of generation over sometimes marginal transmission connections. As a result, if a tie-line opens inadvertently an area might find itself with a sizable block of generators with open throttles on the prime movers and no place for the generated power to be absorbed. Depending upon the ratio of extra generation available and load characteristics the system frequency will increase. Unless this condition is recognized quickly enough steam turbines will reach the 10% overspeed limit and shut the turbine-generator-boiler system down. When this occurs the pooling system connections break down and power is interrupted to a large number of customers, which of course is extremely undesirable. An equally undesirable feature of this type of power unit trip is that several hours may be required to purge the boiler and restart the unit. If however this condition of excess power generation is recognized soon enough, and the excess of the generation beyond that which can be absorbed in the system is disconnected from the system before tripping on overspeed the pooling power system may be maintained without interruption, or at least generation will be left spinning so that ties can be re-established in a minimum of time.

Similarly in the event that there is insufficient power generation connected to the system as for example due to failure of an alternator or an opening of an interconnecting tie line, the excess load connected to the system may overload the energy source whereby the system frequency decreases. If this system frequency decreases to a critical amount the controls at the power station will shut down the turbine-generator-boiler system and the distributing system will "fall apart" and power interruption will occur. If this condition is recognized soon enough, and certain of the excess load which may be dropped with the minimum of inconvenience to the customers is dropped, the pooling connections and power system may be maintained with the minimum of dropped load.

FIELD OF THE INVENTION

It is an object of this invention to recognize not only the existence of an undesired high or low frequency condition representative of either excess generating power capacity or excess load but also to recognize the rate at which the frequency changes so that the necessary disconnection of the excess generation or disconnecting of the excess load may be accomplished before the system is too badly upset.

With these and other objects in mind, the invention will be more particularly pointed out and described in the specification, the hereinafter appended claims, and the drawings in which:

FIG. 1 represents schematically a relaying system embodying the present invention;

FIG. 2 shows a modified form of polarized network which may be used in the practice of the invention; and FIG. 3 shows a solid state thyristor output unit which may be used in the practice of the invention.

Referring to the drawings by characters of reference the numeral 1 represents generally a three-phase power network comprising phase conductors A, B and C. Since the frequency of the alternating power in the network 1 will be the same between any phases, the phase conductors B and C are utilized to furnish the frequency dependent quantity to activate the relay. A potential transformer 2 has its primary winding 3 connected to the conductors B and C and its secondary winding 4 connected to energize a frequency transducer 6. The transducer 6 may be of any type which will provide an output signal at its output terminals 8 and 10 which has an output signal such as voltage which has a magnitude variable with the frequency of the signal applied to its input terminals 12 and 14. The frequency transducer 6 may be and preferably is of the type shown in FIG. 4 of U.S. Pat. No. 2,993,170 wherein the input terminals 12 and 14 correspond to terminals 113b and 115b of said patent and terminals 8 and 10 correspond to the terminals 159b and 161b of said patent.

The output potential from frequency transducer 6 is applied between conductors 16 and 18; conductor 18 being connected to ground or power supply common and conductor 16 being connected to the indicated input terminals of a plurality of operational amplifiers 20, 22 and 24.

The operational amplifiers may be of the type discussed by G. A. and T. M. Korn in their book entitled "Electronic Analog Computers," Second Edition published by McGraw Book Company and copyrighted 1956. As disclosed therein operational amplifiers are high gain direct current amplifiers with feedback circuits in which the phase of the output voltage is inverted with respect to the phase of the input voltage. As discussed therein, the various ancillary circuits associated with these DC amplifiers determine the mathematical computations which will be made thereby. As shown in the instant application, the ancillary circuits of the operational amplifier 20 and 22 are arranged to provide output signals which are the amplified arithmetic sums of a positive signal and a negative signal. The operational amplifier 24 has ancillary circuits which cause it to provide a differentiation process whereby its output signal is proportional to the rate-of-change of magnitude of its input signal.

The output terminal 8 of the frequency transducer 6 is connected to the positive and negative input signal terminals 15 and 17 of the operational amplifiers 20 and 22 and to the positive input terminal 19 of the differentiating operational amplifier 24. The output terminal of the operational amplifier 24 is connected by conductor 21 to the negative and positive terminals 23 and 25 of the operational amplifiers 20 and 22. The outputs of the operational amplifiers 20 and 22 are supervised against misoperation from a potential transformer or fuse failure by "failure of voltage," device 53. The output terminal of the operational amplifier 20 is connected through a pair of normally open contacts 50 of a voltage sensing relay 52 having its operating winding 53 energized from the output terminals of the potential transformer 4 to a polarized controlling network 54. This network 54 may be a polarized relay as shown in FIG. 1 or may be an unpolarized relay network 54A energized through a diode or a solid state output unit 54B or any similar means limiting the response of the network 54 to a desired polarity of the input signal applied thereto. In the instant situation this is a positive going signal. The networks 54 and 54A are provided with controlling contacts 55 and 55A respectively which close when the signal applied to the networks 54 and 54A exceed a minimum value. In the case of 54B the proper signal level gates the silicon controlled rectifier, thereby completing the circuit to device 56. The contacts 55 or 55A as the case may be, when closed, complete an energizing circuit for the breaker control winding 56 which, when energized, opens the circuit controlling contacts in the power circuit 1 to disconnect at least a part of the generation connected to supply energy to the busses A, B and C.

Similarly the output of the operational amplifier 22 is connected through a second pair of normally open contacts 57 of the relay 52 to a polarized controlling network 58 which may be like the network 54, 54A, or 54B. The amplifier 22 is arranged to respond to signals of negative polarity in relation to amplifier 20 since transducer 6 provides a negative going signal for frequencies below the normal power system frequency. Also, the rate-of-change contribution from amplifier 24 is negatively summed at the input to amplifier 22. When network 58 is energized by a signal which exceeds a minimum value it closes its contacts (not shown) to energize the breaker control winding 59 to disconnect a portion of the load 60 energized from the power circuit 1.

It is believed that the remainder of the apparatus may best be described by a description of the operation thereof which is as follows: Assuming that the frequency of the power circuit 1 is substantially constant at for example the usual 60 hertz frequency normal in the United States. If, as discussed in said Patent 2,993,170, the 60 hertz signal applied to the input of the frequency transducer 6 produces no output signal, no voltage will be present at its output terminals 8 and 10 and no signals will be applied by the operational amplifiers 20 and 22 to the networks 54 and 58 and the breakers will remain closed.

If the frequency decreases from the normal 60 hertz to a lower value an increasing potential will appear between the terminals 8 and 10 which is of a polarity in which the terminal 8 is negative with respect to the terminal 10. The instantaneous magnitude of this potential will be a measure of the frequency of the input signal supplied to the input terminals 12 and 14. This negative signal is applied by means of the conductor 16 to the input terminals 15, 17 and 19 of the operational amplifiers 20, 22 and 24. Since amplifier 22, through input terminal 17 is responsive only to negative going signals, only relay 58 will be affected by a decreasing frequency. If the rate of change of frequency in power network 1 is small no substantial output signal will be supplied by the operational amplifier 24 and the input signal to the operational amplifier 22 will be as determined substantially by the potential of the signal applied by the conductor 16, which is substantially a measure of system frequency alone.

If, for example, the relay is set to shed load at 58 hertz, the output signal of the operational amplifier 22 is of a critical magnitude just sufficient to energize the polarized relay 58 and it closes its contacts (not shown). These contacts complete a circuit through the breaker control winding whereupon the breaker opens its contacts and the load 60 is removed from the power circuit. Presumably the removal of this load should be sufficient to bring the load demand in accordance with the generating capacity of the power circuit 1 whereby the circuit frequency will recover to a safe value, presumably 60 hertz and then remain stable. Additional loads which are droppable may be connected to the network 1 through other breakers. Another relaying system similar to the system herein described may be utilized to shed additional load should the disconnection of the load 60 be insufficient to bring the system into a satisfactory operating condition. This would represent shedding load in discrete steps at discrete frequency points in a plan to stabilize the system.

Now, let us assume that, for one reason or another, a substantial amount of generation is lost and the frequency of the system 1 instead of very slowly decreasing, rapidly decreases. The rapidly changing signal applied to the adding network input to operational amplifier 22 will provide an output signal which is no longer directly proportional to the system frequency alone. In the case of the rapidly changing frequency the differentiating network together with the operational amplifier 24 provides a second signal input to the amplifier 22 which will be in additive relation to the signal at the terminal 17 which will increase the positive output of the operational amplifier 22 with an additive amount which is a function of the rate at which the system frequency is decreasing. The operational amplifier 22 will provide a signal to the network 58 which is the summation of the frequency signal and the rate-of-change of frequency signal. For example, the operational amplifier 24 may be set such that with a predetermined rate of decreasing frequency in the network 1 the output of the operational amplifier 22 will reach its critical value to cause the network 58 to energize the winding 59 at, for example 59 hertz. This is desirable, since if the load was not shed until the system frequency reached 58 hertz, accompanied by a rapidly decaying frequency, the frequency of the system 1 might well fall below the critical frequency below which the system would "fall apart" before the decrease in frequency could be terminated, through shedding load, and a "fall apart" or "break-up" of the interconnected power transmission system 1 would result. Since the "adder" supplied by the differentiating network to the conductor 21 is rate-of-change of frequency responsive, the severity of the system frequency disturbance, which may be measured by rate-of-change of frequency, is material to operation of the relay and hence through device 59 will drop load, thereby helping frequency to recover through a better match of generation and load.

A similar operation of the operational amplifiers 20 and 24 occur upon an increase in frequency. In this case, output potential from the frequency transducer 6 increases to render the conductor 16 positive as the system frequency increases above 60 hertz. The positive output signal from the frequency transducer 6 and the negative output signal from the operational amplifier 24 are combined in the adding operational amplifier 20 to energize the network 54. Network 54, which may drop generation, is responsive to a slow increase in frequency of the power circuit to a critical high frequency or upon a lesser increase in frequency when the rate-of-change of frequency becomes greater. When the network 54 energizes the breaker control winding 56 generation is disconnected from the power system 1. This prevents the power system 1 from an undesired increase in frequency and reaching an upper limit where mechanical overspeed devices installed on turbine-generators may automatically trip the unit and put out boiler firing. This is undesirable because boiler purge and restart may consume hours of time. The action of this relay is intended to trip the turbine-generator from the power system 1 by recognizing rate-of-increase of frequency so that the turbine-generator governing system has a maximum of time to adjust governing values and keep the unit "spinning" and ready to re-synchronize at the best time.

It is apparent that other specific types of circuitry may be used as for example a frequency transducer in which the output voltage thereof is of zero magnitude at a frequency slightly higher or lower than the normal system's frequency of 60 hertz. In another form the output of the transducer may have a normal rather than a zero output at the 60 hertz system frequency and vary above or below the normal output potential as the frequency changes from normal. Other specific types of well known differentiating and adding circuits may be used and substituted in the place of the specifically illustrated operational amplifiers and their feedback connections; the essential thing being that the signals for actuating the load shedding and generation remaining breakers should be proportional to the existing frequency plus the rate-of-change of frequency.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed and is desired to be secured by United States Letters patent is as follows:

1. In a protective relaying system for an alternating potential energy transmission system, a pair of signal input terminals adapted to be energized from said system, a pair of system output terminals adapted to be connected to an energy flow controlling breakers, a transducer network having input connections connected to said signal input terminals and output connections energized with a first output quantity having a frequency measuring characteristic variable, said characteristic having a normal value indicative of a normal frequency in said transmission system, a control signal producing network having input means connected to said output connections of said transducer for energization by said frequency measuring characteristic, and output means, said signal producing network including differentiating and adding means, said signal producing network being effective to provide an output control quantity, said output control quantity comprising in combination a first output component which varies in magnitude in accordance with the instantaneous value of said frequency measuring characteristic and a second output component which varies in magnitude in accordance with the rate-of-change of said instantaneous value of said frequency measuring characteristc, said adding means acting to add said components to increase the output difference quantity between (1) the quantity with an unvarying magnitude of said frequency characteristic at said normal value and (2) the magnitude of said output control quantity with an unvarying magnitude of said frequency characteristic at the instant value of said frequency characteristic.

2. The combination of claim 1 in which said frequency measuring characteristic is a direct potential quantity having a zero magnitude at a given value of said system frequency and which increases in magnitude as a consequence of a decrease in said system frequency below said given value, said normal value of said frequency being said given value, and said signal producing network adding said components to increase the magnitude of said control quantity when said system frequency is changing in a decreasing direction.

3. In a protective relaying system for an alternating potential energy transmission system, a pair of input connections adapted to be connected to the distribution system to be protected, a transducer network connected to said input connections and having a frequency responsive output quantity which varies as a function of the frequency of said system, said frequency responsive quantity having a base magnitude when the frequency of said system is at a normal value, said transducer network progressively altering, in a first direction, the magnitude of said frequency quantity from its said base magnitude as said system frequency varies in a first direction from its said normal value, a differentiating network connected to said transducing network and energized by said frequency responsive quantity, said differentiating network having an acceleration output quantity which varies as a function of the rate of change of the magnitude of said frequency responsive quantity, the magnitude of said acceleration quantity being in a first direction when said frequency quantity is changing in its said first direction, and a first adding network connected to said transducing network and to said differentiating network for energization by said frequency responsive quantity and said acceleration quantity and having a first control output quantity, said magnitude of said control quantity being of base magnitude when said system frequency is being maintained at said normal value, said control quantity being of a magnitude which changes from its said base magnitude by an amount dependent upon the combined value of said frequency quantity and said acceleration quantity, said acceleration quantity being in additive magnitude to said frequency quantity when said frequency quantity is changing in its said first direction and the magnitude of said frequency quantity differs from its said base magnitude in its said first direction.

4. The combination of claim 3 in which said base magnitude of said frequency responsive quantity is zero, and said frequency responsive quantity is of a first polarity when said system frequency is below its said normal value and of a second polarity when said system frequency is above its said normal value.

5. The combination of claim 4 in which said differentiating network includes a phase reversing operational amplifier and said adding network includes a phase reversing operational amplifier having a pair of input terminals for the reception of input signals of first and second polarities, and said frequency responsive signal is supplied to one of said pair of amplifier input terminals and said acceleration signal is supplied to the other of said pair of amplifier input terminals.

6. The combination of claim 5 in which there is provided a voltage sensing apparatus having input terminals connected to be energized by the voltage of said transmission system and having circuit controlling means, a control apparatus, and means connecting said control apparatus to said adding network for actuation by said control quantity and including said circuit controlling means of said voltage sensing apparatus.

7. The combination of claim 3 in which there is provided a second adding network connected to said transducer network and to said differentiating network for energization by said frequency responsive quantity and by said acceleration quantity, said second adding network having a second control output quantity, said magnitude of said second control quantity being of base magnitude when said system frequency is at said normal value, said second control quantity being of a magnitude which changes from its said base magnitude by an amount dependent upon the combined value of said frequency quantity and said acceleration quantity, said acceleration quantity being in additive magnitude to said frequency quantity when said frequency quantity is changing in a second direction which is opposite to its said first direction and the magnitude of said frequency quantity differs from its said base magnitude in a second direction which is opposite to its said first direction.

8. The combination of claim 7 in which there is provided first and second control networks, each of said control networks having an input connection, said first and second control networks being effective to place its said circuit controlling apparatus in a first condition solely when their said input connections are individually energized with said first and said second control quantities respectively and when the magnitudes thereof are not less than first and second critical values respectively, means individually connecting said input connections of said first and second control networks to said first and second adding networks respectively.

9. The combination of claim 8 in which a first switching means connects a load means to said system for the withdrawal of electrical energy therefrom, a second switching means connects a generating means to said system for the supply of electrical energy thereto, said first switching means being connected to said first control network and operating to disconnect said load from said system when said first control network is supplied with said first control quantity at a magnitude thereof which represents a quantity greater than a first actual total of said frequency and said acceleration quantity, said second switching means being connected to said second control network and operating to disconnect said generating means from said system when said second control network is supplied with said second control quantity at a magnitude thereof which represents a quantity greater than a second critical total of said frequency and said acceleration quantities.

10. The combination of claim 9 in which said base magnitude of said frequency responsive quantity is zero and said frequency responsive quantity is of a first polarity when said system frequency is below its said normal value and of a second polarity when said system frequency is above its said normal value.

11. The combination of claim 10 in which there is provided voltage sensitive means connected to said system and said switching means and effected to render said first and second switching means ineffective at voltages of said system below a critical magnitude.

12. The combination of claim 11 in which said differentiating network includes a phase reversing operational amplifier and said adding networks each include a phase reversing operational amplifier having a pair of input terminals for the reception of input signals of first and second polarities, and said frequency responsive signal is supplied to one of said input terminals of each said pair of amplifiers of said adding networks, said first and second acceleration signals are supplied individually to the other of said input terminals of said amplifiers of said first and second adding networks respectively, said first switching means including means rendering it sensitive to variation solely of said first control signal, and said second switching means including means rendering it sensitive to variation solely of said second control signal.

13. The combination of claim 9 in which there is provided voltage sensitive means connected to said system and said switching means and effected to render said first and second switching means ineffective at voltages of said system below a critical magnitude.

14. The combination of claim 10 in which said differentiating network includes a phase reversing operational amplifier and said adding networks each include a phase reversing operational amplifier having a pair of input terminals for the reception of input signals of first and second polarities, and said frequency responsive signal is supplied to one of said input terminals of each said pair of amplifiers of said adding networks, said first and second acceleration signals are supplied individually to the other of said input terminals of said amplifiers of said first and second adding networks respectively, said first switching means including means rendering it sensitive to variation solely of said first control signal, and said second switching means including rendering it sensitive to variation solely of said second control signal.

References Cited

UNITED STATES PATENTS

| | | | |
|---|---|---|---|
| 2,561,357 | 7/1951 | Garfield | 340—248 |
| 3,171,966 | 3/1965 | Bergslien | 290—40 |

J D MILLER, Primary Examiner

H. E. MOOSE, Assistant Examiner

U.S. Cl. X.R.

317—19, 20; 322—32